(12) United States Patent
Caswell

(10) Patent No.: US 8,475,859 B2
(45) Date of Patent: Jul. 2, 2013

(54) COFFEE DISPENSING DEVICE AND METHOD

(75) Inventor: Michael R. Caswell, New York City, NY (US)

(73) Assignee: Roasting Plant, Inc., New York, NY (US)

( * ) Notice: Subject to any disclaimer, the term of this patent is extended or adjusted under 35 U.S.C. 154(b) by 825 days.

(21) Appl. No.: 12/500,300

(22) Filed: Jul. 9, 2009

(65) Prior Publication Data

US 2010/0030602 A1  Feb. 4, 2010

Related U.S. Application Data

(63) Continuation of application No. 10/502,148, filed as application No. PCT/US03/02069 on Jan. 23, 2003, now Pat. No. 7,581,488.

(60) Provisional application No. 60/351,589, filed on Jan. 23, 2002.

(51) Int. Cl.
*A23L 1/28* (2006.01)
*A23B 4/03* (2006.01)

(52) U.S. Cl.
USPC .............. 426/433; 426/467; 34/368

(58) Field of Classification Search
USPC .............. 426/433, 467, 523; 34/108, 603, 34/13, 56, 62, 33, 168, 181, 368; 99/290, 99/286, 280, 279
See application file for complete search history.

(56) References Cited

U.S. PATENT DOCUMENTS

| | | | |
|---|---|---|---|
| 3,153,377 A | 10/1964 | Bosak | |
| 3,871,273 A * | 3/1975 | Hsieh | 99/286 |
| 4,392,119 A | 7/1983 | Price | |
| 4,895,308 A | 1/1990 | Tanaka | |
| 4,951,561 A * | 8/1990 | Moorman et al. | 99/471 |
| 5,094,153 A | 3/1992 | Helbling | |
| 5,465,656 A | 11/1995 | Ogden | |
| 7,581,488 B2 | 9/2009 | Caswell | |

FOREIGN PATENT DOCUMENTS

| | | |
|---|---|---|
| EP | 0213645 A | 3/1987 |
| JP | A S63-304395 | 12/1988 |
| JP | A H02-276536 | 11/1990 |
| JP | A H03-266966 | 11/1991 |
| JP | A H05-161552 | 6/1993 |

(Continued)

OTHER PUBLICATIONS

Office Action in Japanese Application No. 2003-561999, dated Mar. 18, 2009.

(Continued)

*Primary Examiner* — Reginald L Alexander
(74) *Attorney, Agent, or Firm* — McCarter & English, LLP

(57) ABSTRACT

A coffee dispensing device is provided with a transport device that couples various components for the processing of unroasted coffee beans together. For example a roaster may be coupled to a grinding and brewing device to enable the transfer of roasted coffee beans between the roaster and grinder/brewer. Also, the transport device may transfer the roasted coffee beans from a roaster to an output port so that roasted coffee beans may be obtained. An automated coffee transaction device (ACTD) is also provided to automate aspects of the purchasing of coffee. A service delay projection calculator is also provided to estimate the expected wait time of a customer entering a queue.

11 Claims, 4 Drawing Sheets

FOREIGN PATENT DOCUMENTS

| | | |
|---|---|---|
| JP | A H05-197879 | 8/1993 |
| JP | A H05-337049 | 12/1993 |
| JP | A H06-026915 | 2/1994 |
| JP | A H09-330468 | 12/1997 |
| JP | A H10-055488 | 2/1998 |
| JP | A H11-066419 | 3/1999 |
| JP | A 2001-517515 | 9/2001 |
| WO | WO 99/16337 | 4/1999 |
| WO | WO 03/062101 | 7/2003 |

OTHER PUBLICATIONS

Office Action in U.S. Appl. No. 10/502,148, dated Sep. 17, 2008.
Search Report in European Application No. EP 03 707 502.5, dated May 3, 2005 and Feb. 4, 2005.
International Search Report in Application No. PCT/US2003/002069, dated Aug. 13, 2003.
Office Action in Canadian Application No. 2,474,085, dated Jul. 13, 2009.
Notice of Reasons for Rejection in Japanese Application No. 2003-561999, dated Jan. 7, 2010.
International Preliminary Examination Report in Application No. PCT/US2003/002069, dated May 26, 2004.
Decision to grant a patent in Japanese Application No. 2003-561999, dated Feb. 10, 2011.
Office Action in Brazilian Patent Application No. PI0307079-4 dated Mar. 29, 2011.
Communication in European Application No. EP 03 707 502.5, dated Jul. 15, 2005.

* cited by examiner

COFFEE DISPENSING DEVICE AND METHOD

RELATED APPLICATIONS

The present application is a continuation of 10/502,148, filed Mar. 2, 2005, which, in turn, is a 35 U.S.C. 371 national stage filing of International Application No. PCT/US03/02069, filed Jan. 23, 2003, which claims priority to U.S. Provisional Application No. 60/351,589, filed Jan. 23, 2002, the entire contents of each of these applications are hereby incorporated by reference.

SUMMARY

A coffee dispensing device provides for the transportation mechanism for raw and/or roasted coffee beans at a retail location and dispenses coffee or coffee beans for retail purchase. The invention can allow coffee to be roasted, transported, ground, and/or brewed without needing to be packaged, staged, or transported manually by store staff. Because batching, weighing, and storing of roasted coffee may be eliminated, coffee is brewed from beans that were just roasted. This can significantly enhance brewed coffee quality, reduce product loss and therefore cost of goods, and reduce labor requirements. The invention, in various embodiments, comprises apparatus and methods for making coffee and providing roasted coffee beans.

BRIEF DESCRIPTION OF THE DRAWINGS

The invention will be apparent from the description herein and the accompanying drawings, in which like reference characters refer to the same parts throughout the different views.

DETAILED DESCRIPTION

One embodiment of the invention includes the transport of coffee beans from a roaster to a brewer. As shown by way of example in FIG. 1, an illustrated embodiment of a coffee dispensing device 100 according to an embodiment of the invention includes in-store roasting, and then grinding and brewing to create fresh/high quality coffee beverages. The roasting, grinding and brewing may optionally be almost immediate, e.g. on-demand at the time of a customer's order.

Figure 1:
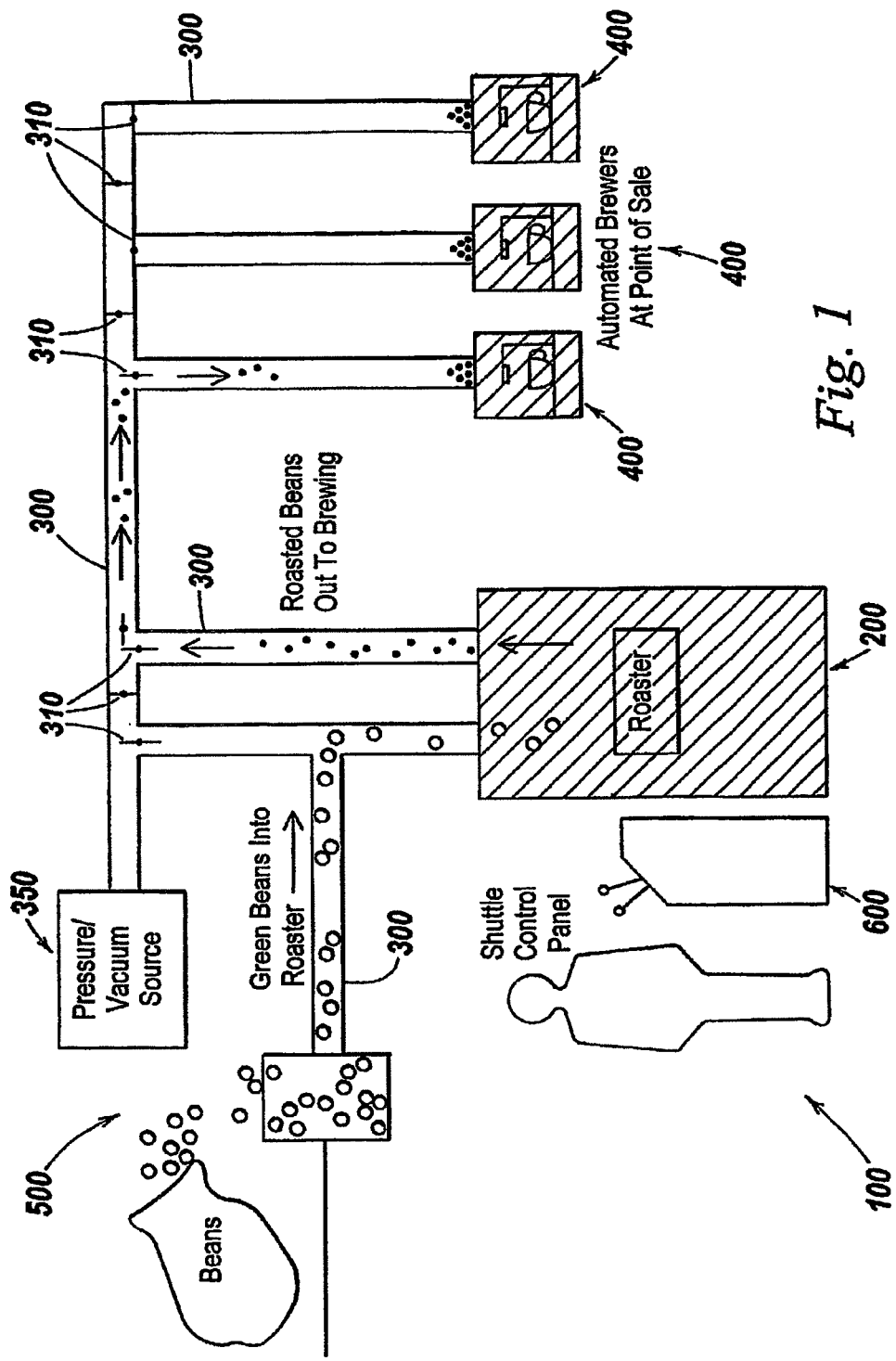
FIG. 1 illustrates an example of a coffee dispensing device according to an embodiment of the invention.
Figure 2:
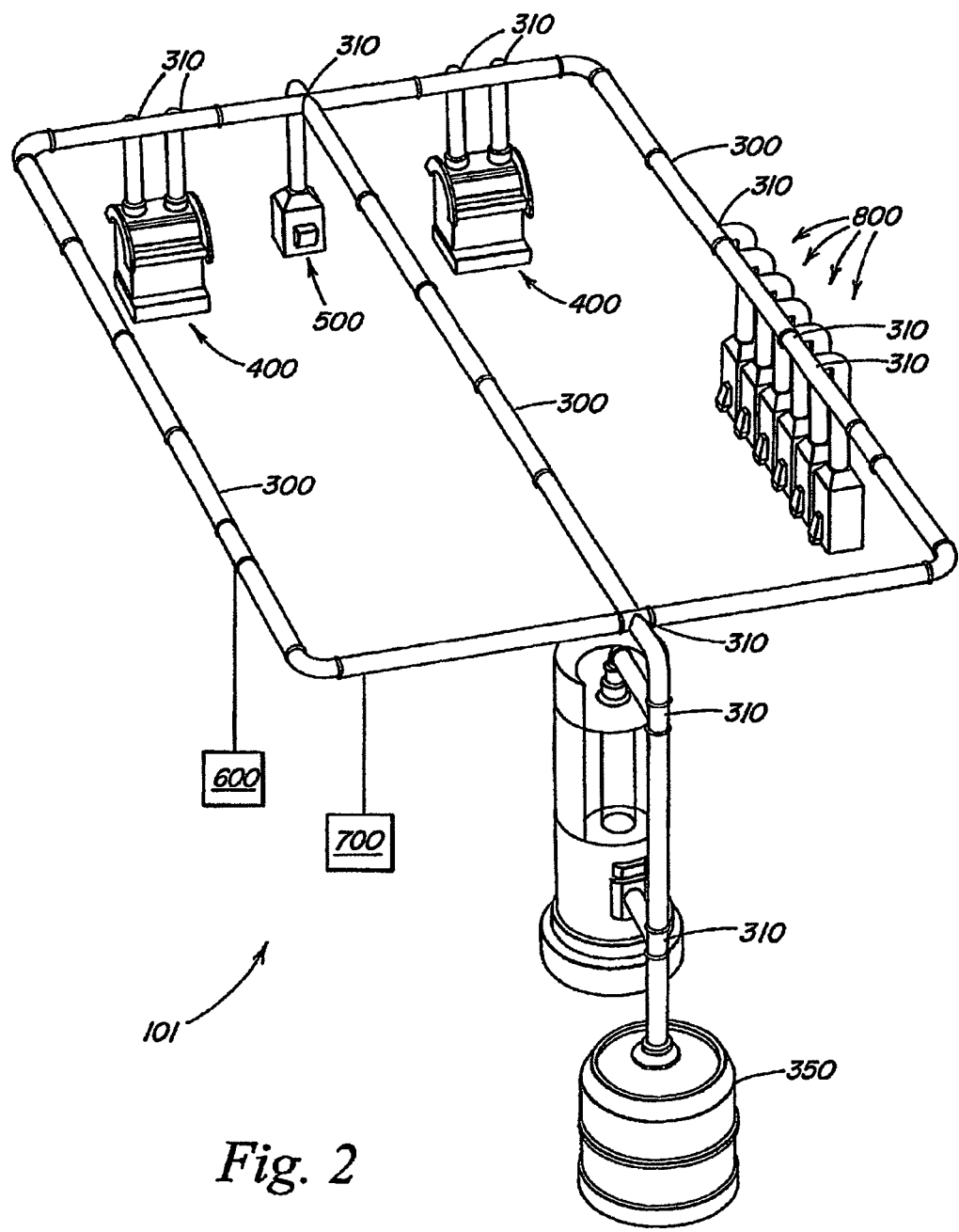
FIG. 2 illustrates a further example of a coffee dispensing device according to an embodiment of the invention.

With reference to FIGS. 1 and 2, various examples of the invention may include coffee dispensing devices 100, 101 having a roaster 200 coupled to a transport device 300. The transport device 300 may include a propulsion mechanism 350. Also coupled to the transport device 300 may be a brewer 400. In some implementations, the brewer 400 may include a grinder. Alternatively, the grinder may be separately located and coupled to the transport device 300. A loading bin 500 is coupled to the transport device 300 and can receive, and optionally store, unroasted coffee beans.

The type of coffee bean, and subsequent coffee beverage, is not limited to any particular type of coffee bean-derived beverage. For example, the product produced may include, but is not limited to, the following: mountain blend type coffee; decaffeinated coffee; espresso; and cappuccino. Other variations of beverages will be apparent to one of ordinary skill in the art.

The roaster 200 may be a roaster known in the art or may be a customized roaster. One example of a roaster known in the art is the Quantik Air Roaster available from Roastery Development Group of Redwood City, Calif. A plurality of roasters may be used, of similar or different types.

The transport device 300 physically connects components for the processing of unroasted coffee beans into a brewed cup of coffee together. For example, the transport device 300 may include tubes or ducting. In one implementation, transparent tubes are used. The tube may provide a conduit through which the beans will physically travel among components of the coffee dispensing device. In one implementation, such as is shown in FIG. 2, the transport device 300 may be located at least partially over a portion of a store in which customers may be located, thereby transporting coffee beans over customers. Optionally, the tube or ducting will be food grade. In another embodiment, there can be separate tubes or ducting forming different paths to each of the multiple brewers or roasters, or other components. In one variation, one path may be used to transport caffeinated coffee beans and a separate path to transport decaffeinated coffee beans. Also, multiple paths could be used for a frequently used type of coffee bean, such as a house bean, and another path used for other bean types. One or more valves 310 may be provided within the transport device to direct the coffee beans to different locations. For example, electromechanically-actuated valves may be positioned within the tubing, or ducting to control/direct the flow of beans within the transport device to direct the beans to or from the desired components.

The propulsion mechanism 350 is provided to facilitate movement of the coffee beans through the transport device. In one embodiment, a positive pressure differential is created in the tube or duct that will facilitate the transport of coffee beans. In another embodiment, negative pressure differential, e.g. a vacuum, is created within the tubing or ducting to facilitate transport of coffee beans from one point in the device to another. It is understood that a combination of positive and negative pressures may be used within an implementation of the invention.

According to another embodiment, the transport device may include belts, buckets or cups to transport coffee beans. In the case of belts, buckets or cups, the propulsion mechanism is adapted to move the belts, buckets or cups among components of the coffee dispensing device in order to move the coffee beans.

One or more grinders may be provided to grind coffee for brewing. The grinder may be coupled to the roaster via the transport device. The grinder may be attached to one or more brewers 400, optionally by way of the transport device. Or, the grinder and brewer may be combined in an integrated unit. One example of a combined brewer/grinder known in the art that may be used is the Wega Gemini Mod. Latte available from Wega of Italy. Optionally, the grinder and brewer are located at a point of sale. The grinder and brewer may be configured for operation by a customer and/or by store employees. The brewer can function as a dispensing device for the brewed coffee. Optionally, roasted coffee beans can optionally be stored in a portion of the transport device 300 coupled to the grinder and/or brewer or a combined grinder/brewer unit. If several grinder/brewer units are provided, various types of coffee beans or ground coffee could be stored within the units or a portion of the transport device 300 coupled to the unit. Also, as shown in FIG. 2, a grinder/brewer unit may be provided with multiple connections to the transport device 300 to enable various types of coffee beans or ground coffee to be stored within one or more of the connections to the grinder/brewer device.

According to another embodiment a control panel 600 is provided. The control panel may allow an individual to turn on or off the coffee dispensing device and/or control the flow of coffee beans throughout the apparatus. The control panel may control the length of roasting time of the coffee beans. In one embodiment, the control panel may be linked to the propulsion mechanism to control the air flow within the tubes and/or to the valves to control valve position and therefore air flow direction and coffee bean travel within the system.

Optionally, an interface panel 700 can be provided at a location accessible to a customer, so as to allow for the selection of a coffee type. Alternatively, the control panel 600 can select the coffee type.

The loading bin 500 is provided to function as a receiving port for unroasted coffee beans into the transport device 300. Optionally, the loading bin 500 may be coupled to a storage bin. Alternatively or in addition, the loading bin 500 may be easily accessible for an employee to insert coffee beans when necessary.

Another embodiment of the invention provides for the transport of unroasted coffee beans, through a roaster, to one or more output ports 800, without grinding or brewing. The roasted coffee beans can be gathered at the output port for sale to a customer. Various types of roasted coffee beans can be stored in each of the output ports 800, or a portion of the transport device 300 coupled to the output port 800. Optionally, a grinder may also be coupled to the output port to provide ground coffee for sale to a customer. The output port may optionally be located at a point of sale.

Aspects of various embodiments may be used in combination. For example, pressurized tubing may be used in combination with a belt in the transport device. By way of example, a belt may be used to move coffee beans from the receiving port to the roaster and tubing used to move coffee beans from the roaster to the grinder and/or brewer.

According to a method of the invention, the coffee dispensing device 100, 101 can receive unroasted coffee beans and transport them among separated components for the roasting of coffee beans and subsequent grinding of the coffee beans and brewing of coffee from the ground coffee. In one implementation, the roasting may take 5 to 6 minutes, but may be varied. Although the invention is not so limited, roasted coffee beans can be stored within the coffee dispensing device to enable brewing of coffee between 4 to 24 hours after roasting to enhance the flavor of the roasted coffee, although the brewing may begin immediately after roasting and grinding, if desired.

In another embodiment, this device can work with other embodiments described herein.

According to a further embodiment of the invention, an Automated Coffee Transaction Device (ACTD) is a device, which will facilitate the sale of coffee products. ACTD will allow a person to get a cup of coffee without having to complete a typical transaction at the point of sale (POS). The ACTD user will not have to pay cash, or use a charge card and sign a receipt. ACTD customers may charge transactions to, or preload the ACTD with a specific dollar amount. Alternatively or in addition, an account for an individual person or group can be set up.

Figure 3:
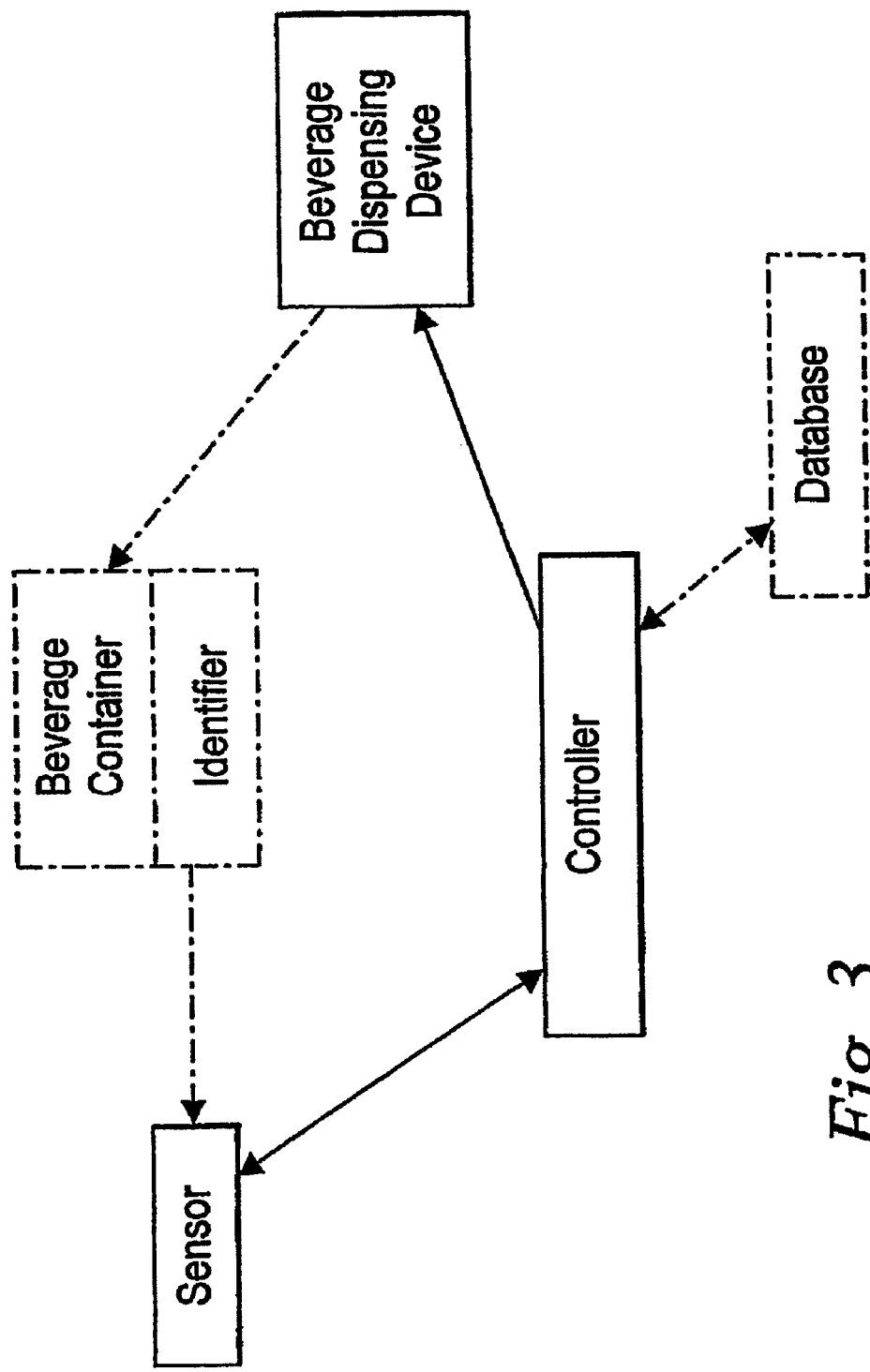
FIG. 3 illustrates a automated coffee transaction device according to a further embodiment of the invention.

As shown by way of example in FIG. 3, an illustrated embodiment of the invention includes the following components. A beverage dispenser device is provided. The beverage dispenser device is adapted to dispense any type of liquid product. For example, liquid products include, but are not limited to, coffee.

A sensor is provided and adapted to read an identifier on a beverage container. In one embodiment, the sensor is at the point of sale. The sensor serves to capture the information relayed from the identifier.

A controller is also provided. The controller will obtain information from the sensor. In one embodiment, the controller can be configured to store data pertaining to the identifiers and hence beverage containers and, optionally, customers. In another embodiment, the controller may optionally be configured to interface with a database for use in conducting transaction.

The database may be a national database, including information from identifiers nationwide, or may only include identifier information from a region, state, town or store. The database may be configured to associate an identifier with a customer. The database may also associate an identifier with a wide variety of customer information. Examples of such customer information may include contact information, purchase history, eligibility for pricing discounts, billing information, account information and any association to other customers or groups. Further examples of customer information include those typically used in customer loyalty programs. In one embodiment, the database will contain a list of items purchased by the customer. A further embodiment involves the use of customized pricing information to enable different pricing of beverages for different consumers or other promotional initiatives customized to specific purchase patterns or customers. A further embodiment allows the typical purchase selection of the customer to be identified by the controller and communicated to a computer or displayed. A further embodiment involves a centralized database to track transactions at a plurality of points of sale, including, optionally, all points of sale.

The various components of the invention may be integrated, located near each other or be separated by thousands of miles. Various configurations of communication between the identifier, sensor, controller, beverage dispensing device and optional database as described herein will be apparent to one of skill in the art. Examples include, but are not limited to, the Internet, local area networking, wide area networking, electrical, optical, wired and wireless configurations and combinations thereof.

An alternate embodiment includes a beverage container having an identifier. The beverage container is not limited to any particular shape. The position of the identifier is not limited to any particular region, but is located to be read by the sensor. The identifier may serve to identify the container additionally to identify the customer using the container and optionally to identify the customer using the container. In one embodiment, the identifier is a barcode. In another embodiment, the identifier is an electronic chip such as a Smart Chip. In another embodiment, there can be a family of identifiers, enabling identifiers to be group by various affiliations, such as family or company.

In another embodiment, this device can work with other embodiments described herein.

According to a further embodiment of the invention, a Service Delay Projection Calculator is intended to allow a retail location to display to prospective customers the approximate wait time necessary to be served at the retail location. One example includes a wait time to get a cup of coffee at a coffee store. The system will capture information pertaining to the number of customers in the queue and current transaction intervals to calculate how long a customer entering the queue should expect to wait before they receive their service. Optionally, the system may capture information relating to when the customers entered the queue, or the rate of entry of customers.

In one example, during the morning rush when most customers are contemplating stopping on their way to work, an embodiment of the invention will communicate how quickly they can get their coffee so they can realistically decide if they can fit a stop in.

Figure 4:
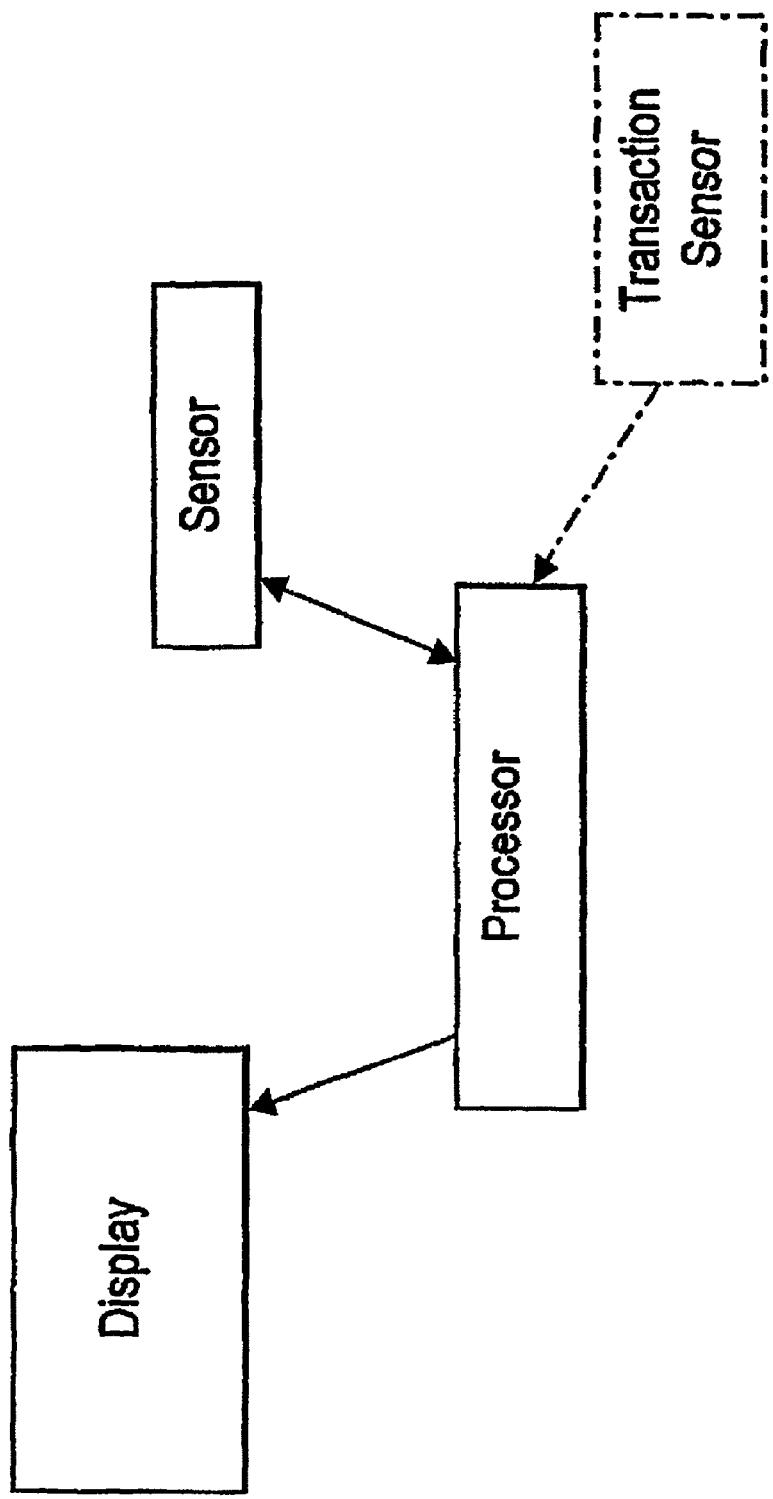
FIG. 4 illustrates a service delay projection calculator according to an embodiment of the invention.

As shown by way of example in FIG. 4, an illustrated embodiment of the invention includes a customer sensor to detect customers in the queue, such as by detecting entry and exit of customers from the queue. In one embodiment, the sensor is one or more turnstiles. In another embodiment, the sensor is one or more infrared sensors. A further embodiment involves a light beam that is interrupted as a customer enters the queue and another light beam interrupted as the customer exits the queue.

A display is also provided. The display is adapted to show a person the expected wait time for service. The information will be updated at regular intervals on an ongoing basis so that customers will always have an accurate projection of the wait time.

A processor is provided and adapted to acquire information from the sensor and provide information to the display.

In this embodiment, the processor determines the number of customers in the queue by obtaining information from the customer sensor. By knowing the rate of customers leaving the queue and the number of customers in the queue, the approximate wait time can be determined for prospective customers.

In another embodiment, the invention comprises the display, sensor, processor, customer sensor and a transaction sensor. FIG. 3 provides an illustration of this embodiment. The display and processor are as described above. Here, the customer sensor counts customers entering the queue. According to one embodiment, the transaction sensor interfaces with a point of sale. In one embodiment, the transaction sensor interfaces with a cash register. In another embodiment, the transaction sensor comprises a sensor and a computer. In a further embodiment, the transaction sensor comprises a sensor and a device which can record, analyze, and transfer data to a processor. The transaction sensor will obtain the number of transactions, thereby representing the number of customers that have exited the queue.

In this embodiment, the processor determines the number of customers in the queue by obtaining information from the customer sensor and transaction sensor. By knowing the rate of transactions, or customers leaving the queue, and the number of customers in the queue, the approximate wait time can be determined for prospective customers.

In another embodiment, the display may be provided through a computer network, such as the Internet. This will allow a person to access his/her wait time before departing for the store or place of purchase.

In another embodiment, this device can work with other embodiments described herein.

The invention claimed is:

1. A method of transporting coffee beans and dispensing coffee, comprising:
    receiving unroasted coffee beans into a loading bin;
    transporting the unroasted coffee beans to a roaster by the use of a transport device employing a propulsion mechanism generating a pressure differential within at least one tube of the transport device;
    transporting roasted coffee beans to a grinder/brewer by use of the transport device;
    grinding the roaster coffee beans; and
    brewing the coffee.

2. The method of claim 1, wherein the at least one tube is transparent and is configured to transport the coffee beans in view of a customer.

3. The method of claim 1, wherein the pressure differential includes a positive pressure differential.

4. The method of claim 1, further comprising:
    generating a negative pressure differential to cause the pressure differential.

5. The method of claim 1, further comprising:
    transporting the coffee beans using at least one of the group of a belt, a bucket and a cup.

6. The method of claim 1, wherein the grinder is located together with the brewer.

7. The method of claim 1, further comprising:
    providing a plurality of roasted coffee beans at an output port coupled to the transport device.

8. The method of claim 1, further comprising:
    receiving, at an interface panel, a selection of a coffee type of the coffee beans received at the loading bin.

9. The method of claim 1, further comprising:
    receiving an instruction, at a control panel, to control the transport of the coffee beans by the transport device.

10. The method of claim 9, further comprising:
    in response to the instruction, using the propulsion mechanism to control an air flow in the transport device.

11. The method of claim 9, further comprising:
    in response to the instruction, using the propulsion mechanism to control a direction of the air flow in the transport device.

* * * * *